US008008626B2

(12) United States Patent
Kub et al.

(10) Patent No.: US 8,008,626 B2
(45) Date of Patent: *Aug. 30, 2011

(54) NEUTRON DETECTOR WITH GAMMA RAY ISOLATION

(75) Inventors: Francis J Kub, Arnold, MD (US); Bernard F Phlips, Accokeek, MD (US); Karl D Hobart, Upper Marlboro, MD (US); Eric A Wulf, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/010,996

(22) Filed: Jan. 21, 2011

(65) Prior Publication Data

US 2011/0127527 A1 Jun. 2, 2011

Related U.S. Application Data

(63) Continuation of application No. 12/406,262, filed on Mar. 18, 2009, now Pat. No. 7,902,513.

(51) Int. Cl.
*G01T 3/08* (2006.01)
(52) U.S. Cl. ................................. 250/370.05
(58) Field of Classification Search . 250/370.01–370.15
See application file for complete search history.

(56) References Cited

U.S. PATENT DOCUMENTS 7,368,794 B2 * 5/2008 Caruso et al. ................. 257/428
2006/0255282 A1 * 11/2006 Nikolic et al. ........... 250/390.01

OTHER PUBLICATIONS

Sueva et al., "Silicon detectors for neutron detection in the presence of high gamma background", 2000, Applied Physics A Materials Science & Processing, vol. 71, pp. 211-214.*
Phlips et al., "Neutron detection using large area silicon detectors," 2007, Nuclear Instruments and Methods in Physics Research A, vol. 579, pp. 173-176.*
Zhang et al., "Investigation of the sensitivity of a Si-PIN detector system to 14 MeV neutrons," 2004, Measurement Science Technology, vol. 15, pp. 1823-1826.*
Mesquita et al., "Development of neutron detector using the PIN photodiode with polyehtylne (n,p) converter," 2003, IEEE Transactions on Nuclear Science, vol. 50, No. 4, pp. 1170-1174.*
Hosono et al., "Fast neutron detector using PIN-type silicon photodiode," 1995, Nuclear Instruments and Methods in Physics Research A, vol. 361, pp. 554-557.*
Flandre et al., "Characterization of SOI MOSFETs by gate capacitance measurements," 1993, IEEE Proceedings on International Conference on Microelectronic Test Structures, vol. 6, pp. 283-287.*
Parker et al., "3D-A proposed new achitecture for solid-state radiation detectors," 1997, Nuclear Instruments and Methods in Physics Research A, vol. 395, pp. 328-343.*

* cited by examiner

*Primary Examiner* — Kiho Kim
(74) *Attorney, Agent, or Firm* — Amy L. Ressing; Stephen T. Hunnius

(57) ABSTRACT

A silicon-on-insulator (SOI) neutron detector comprising a silicon-on-insulator structure, wherein the silicon-on-insulator structure consists of an active semiconductor layer, a buried layer, and a handle substrate, a lateral carrier transport and collection detector structure within the active semiconductor layer of the silicon-on-insulator structure, and a neutron to high energy particle converter layer on the active semiconductor layer.

26 Claims, 7 Drawing Sheets

NEUTRON DETECTOR WITH GAMMA RAY ISOLATION

This application is a continuing application of and claims the benefit of U.S. patent application Ser. No. 12/406,262 filed on Mar. 18, 2009, the entirety of which is herein incorporated by reference.

Described herein is a silicon-on-insulator (SOI) neutron detector implemented with lateral carrier transport and collection detector structure within the active semiconductor layer of the SOI neutron detector and having a neutron to high energy particle converter layer residing in close proximity to the active semiconductor layer. This neutron detector has high immunity to gamma ray generated carriers, fast rise time neutron detector response, low capacitance to enable high detector sensitivity and large area neutron detector, high neutron detector efficiency, and the ability to detect either thermal neutrons or fast neutrons.

A common neutron detector used for the purpose of locating nuclear materials is the helium-3 proportional counter. This counter detects neutrons via protons that are created when a neutron reacts with helium-3. Although this detector has been used for many decades, it suffers several disadvantages. Helium-3 proportional counters tend to be bulky and expensive and have slow response times. Furthermore, they require very high voltages to operate.

Semiconductor detectors have also been used as neutron detectors for decades. In these detectors, the semiconductor is coated with a neutron to high energy particle converter material such as boron-10 or litihium-6 (often in the form of $^6$LiF), which has a high probability of reacting with incoming thermal neutrons, resulting in for example a high energy alpha particle and a recoiling nucleus, as illustrated in FIG. 1. FIG. 2 shows that the neutron cross-section, proportional to the probability for interaction, is orders of magnitude higher for boron-10 than for silicon-28, making it an ideal neutron-interactive coating. The alpha particle resulting from the neutron interaction with boron-10 has an energy of approximately 1.472 MeV and will only travel a short (less than 5.7 microns) distance before depositing the majority of its energy in the detector material.

Several research groups have done pioneering work in the development of semiconductor neutron detectors. Recently, much progress has been made in increasing the efficiency and performance of thin-film coated GaAs (gallium-arsenide) detectors, FIG. 3, left. For example, researchers have worked on optimizing detector parameters such as what thickness of boron-10 and $^6$LiF converter layers yields an optimal efficiency (FIG. 3, right). The same group has also led in a "sandwiched" layer design, boron-10 coated dimpled arrays, bi-layers of boron-10 and $^6$LiF, and "dimpled" array further increasing the neutron-detection efficiency.

To date, the GaAs neutron detectors are have a relatively small area.

The proposed SOI detector will utilize Very Large Scale Integration (VLSI) manufacturing techniques to fabricate large area, low cost neutron detector arrays.

FIG. 1 is a schematic of a thermal neutron/fast neutron detector assembly. A ΔE/E spectrometer with a HDPE layer can be used to count fast neutrons. A sandwiched SOI lateral PiN detector coated with a boron-10 converter layer can be used to detect thermal neutrons.

Figure 1:
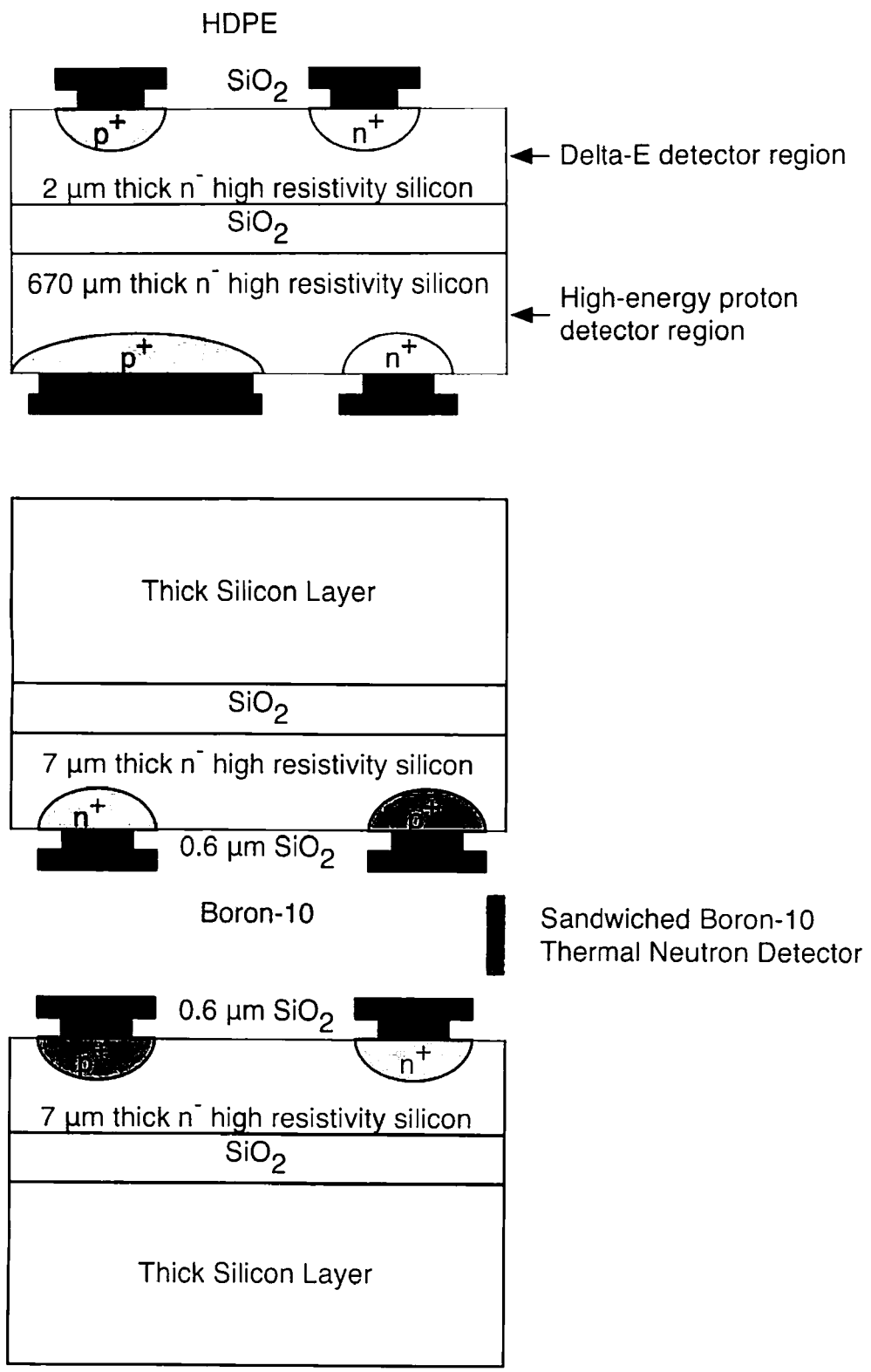
Figure 2:
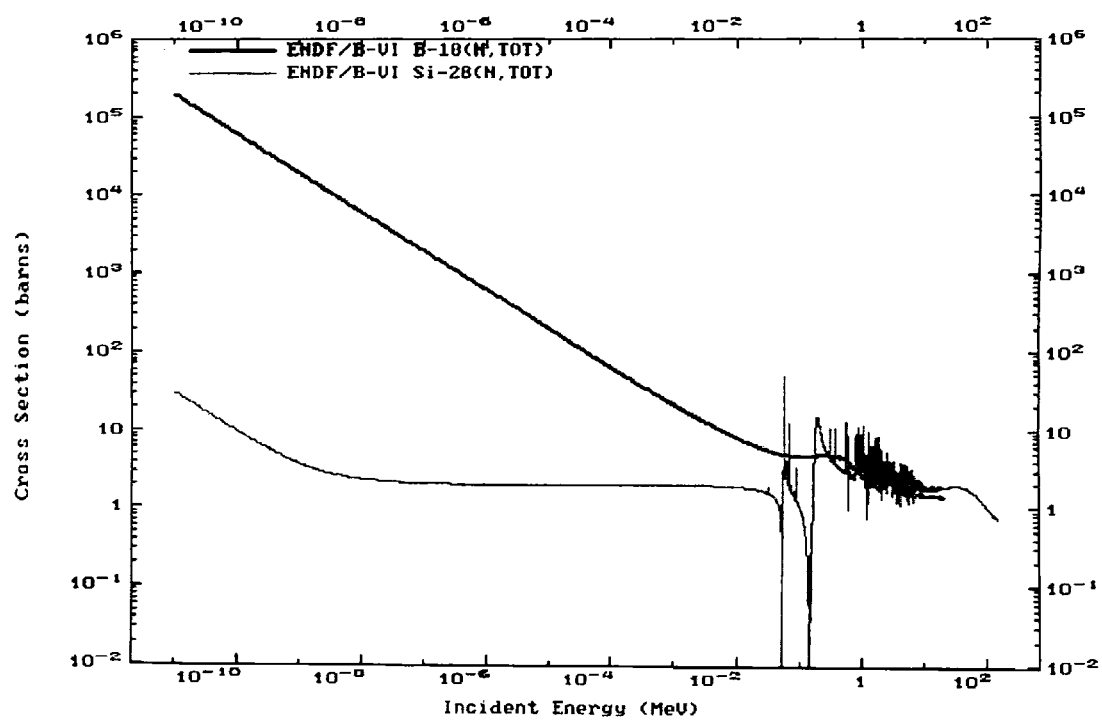
FIG. 2 is a graph of neutron-interaction cross-section vs. neutron energy for boron-10 and silicon 28. The probability of the neutron interacting is orders of magnitude higher for boron-10 than for silicon-28.
Figure 3:
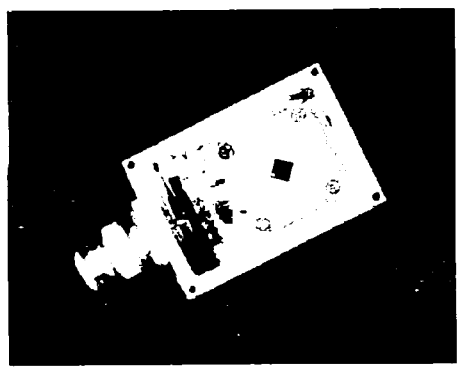
FIG. 3 shows a GaAs detector on the left. On the right is a graph of efficiency vs. film thickness for boron-10 and lithium-6 for a GaAs detector.
Figure 3:
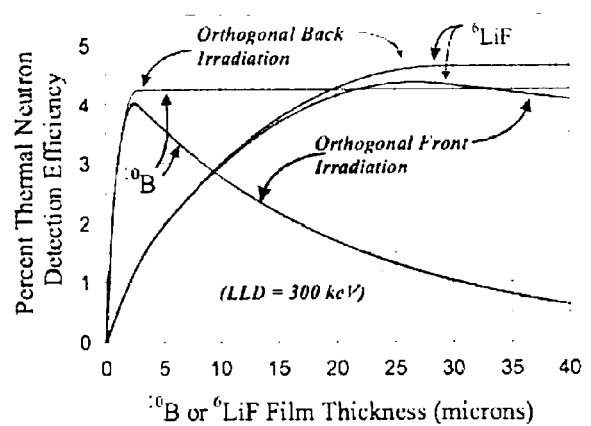
Figure 4:
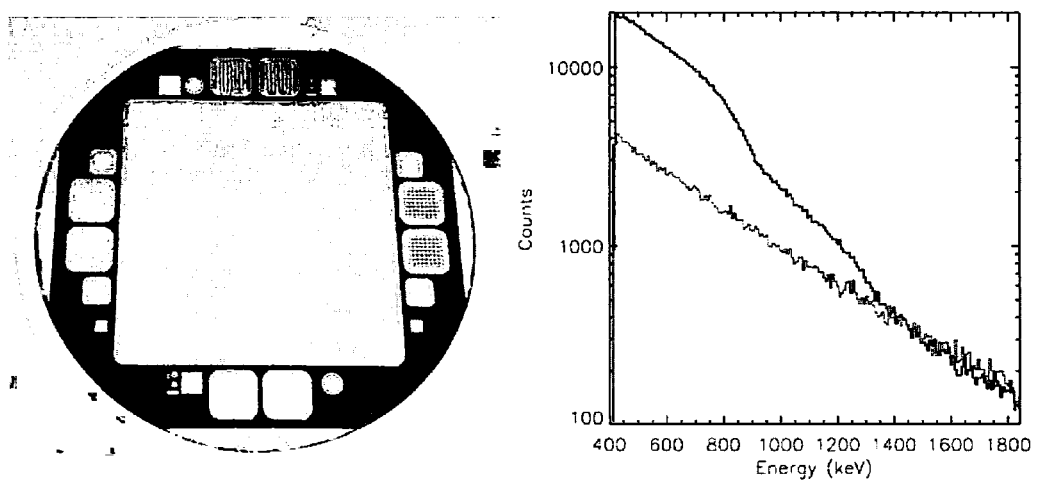

FIG. 4 shows a 150 mm diameter silicon wafer with 9.5 cm×9.5 cm strip detector array used for proof-of-principle tests of alpha particle detection on the left. On the right is a thermal neutron detection measurement showing alpha particle spectrum for 1.47 MeV and 1.78 MeV. The bottom curve is the background gamma ray spectrum.

Figure 5:
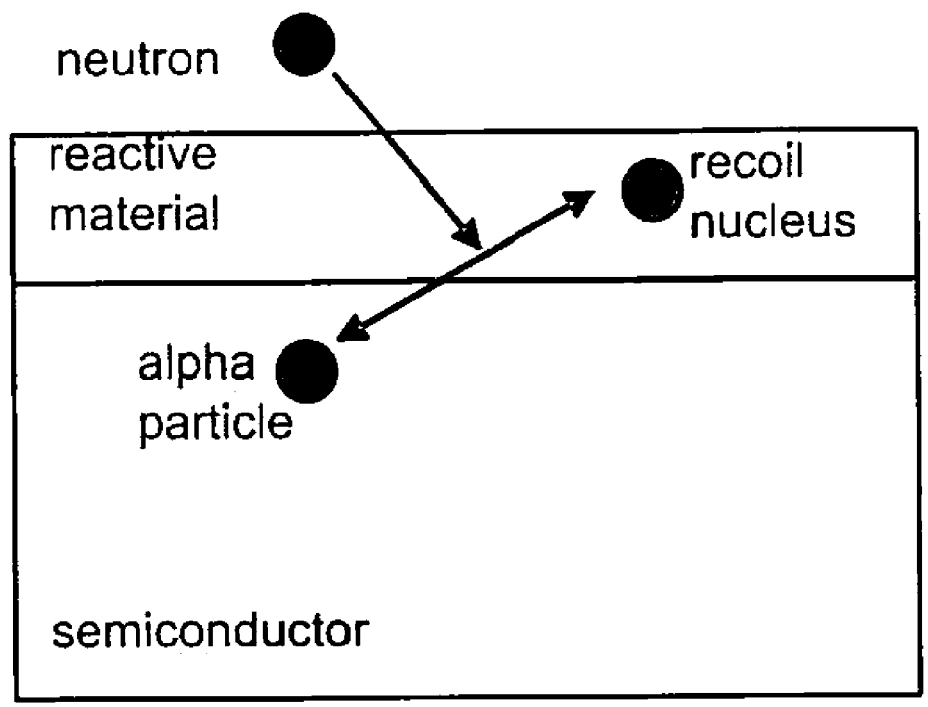

FIG. 5 illustrates a working semiconductor neutron detector. A neutron hits the converter layer and creates an alpha particle. The alpha particle is detected by the semiconductor material.

Figure 6:
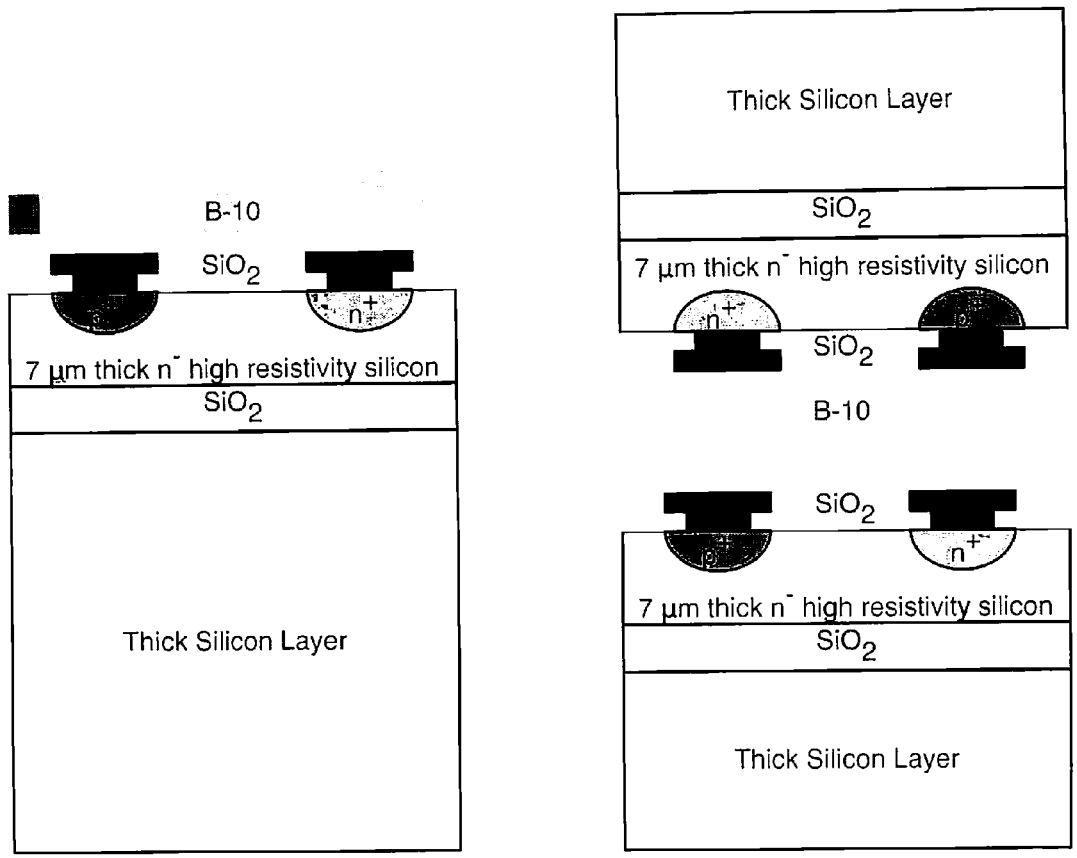

FIG. 6 illustrates an example detector on the left. On the right is illustrated a detector in a "sandwich" configuration. Additionally, several parameters of the detector geometry can be optimized.

Figure 7:
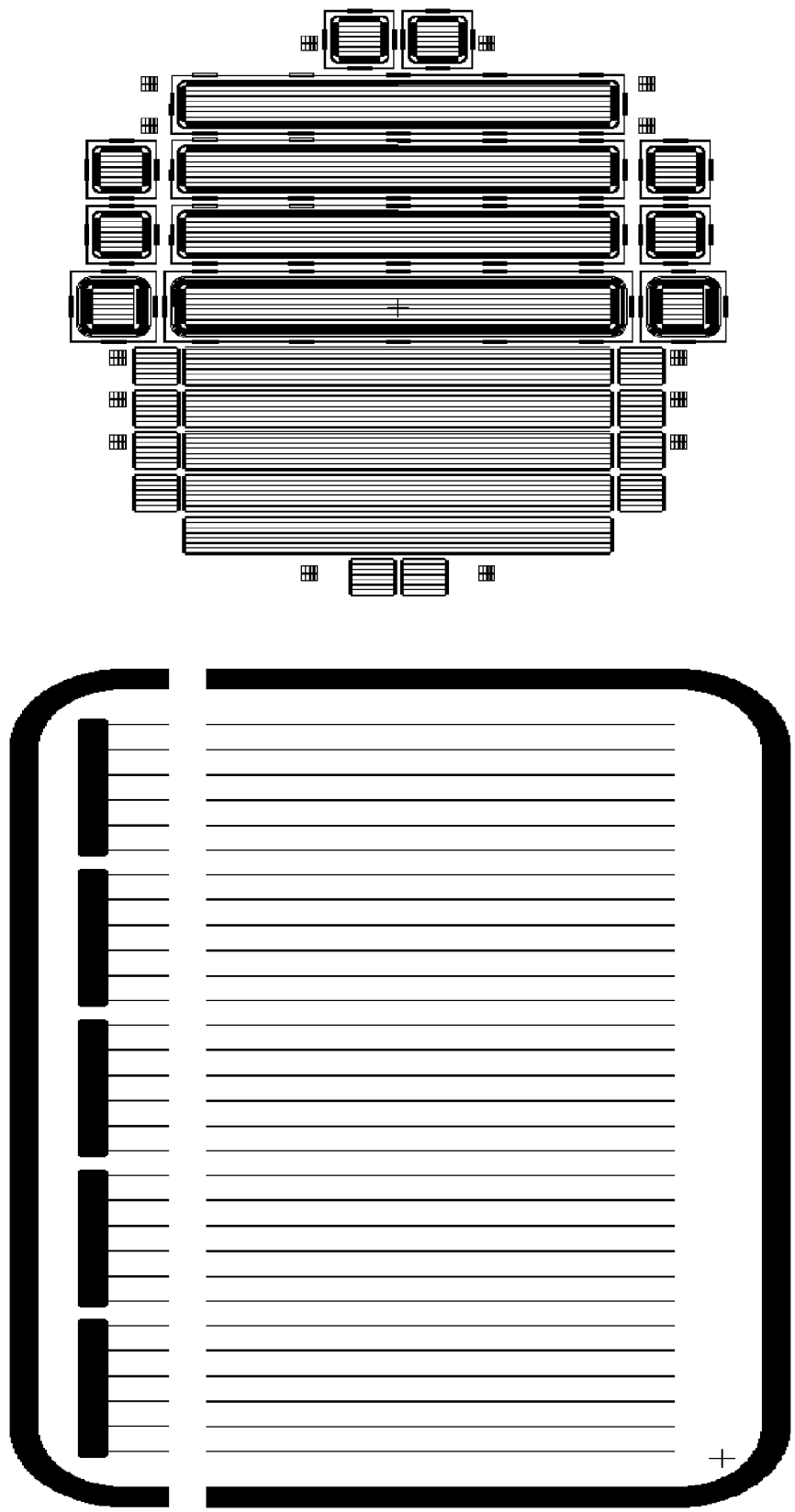

FIG. 7 illustrates a layout of an SOI neutron detector array with 60 μm between narrow P+ and N+ junctions (53 mm long) five strips 700 μm wide shown on the left. On the right is shown a mask design for a 4-inch SOI thermal neutron detector wafer.

EXAMPLE 1

NRL has recently demonstrated a thermal neutron detector that is likely the largest area semiconductor neutron detector implemented in single-crystal silicon to date. The thermal neutron detector was implemented by coating a silicon strip detector wafer having 64 channels covering an area of 9.5 cm×9.5 cm with 99% pure, 1.5 μm thick boron-10 layer. The strip detector was fabricated on 150 mm diameter high resistivity silicon wafers shown in FIG. 4, left. The measured alpha particle spectrum resulting from thermal neutron data for this boron-10 coated 9.5 cm×9.5 cm strip detector array is shown in FIG. 4, left. The bottom curve is background gamma rays. The top curve shows the spectrum resulting from 1.47 MeV and 1.78 MeV alpha particles. A unique feature of this strip detector is that the capacitance of the detector elements is so low that it was possible to readout 50 channels having an area of 7 cm×9 cm=60 cm2 with one amplifier with good energy resolution for 1.47 MeV and 1.78 MeV alpha particles. The ~63 cm2 of boron-coated silicon were connected to a single charge-sensitive preamplifier and a nuclear spectroscopy shaping amplifier with a shaping time of 0.5 microseconds. The output of the shaping amplifier was connected to a multichannel analyzer, producing the spectrum shown in FIG. 4. A small number of readout amplifiers would greatly simplify the implementation of prototype and production detector arrays.

In a second implementation, a neutron detector utilizing a silicon-on-insulator (SOI) substrate material has been demonstrated. The neutron detector consists of a silicon-on-insulator (SOI) neutron detector implemented with lateral carrier transport and collection detector structure within the active semiconductor layer of the SOI material and having a having a neutron to high energy particle converter layer (neutron converter layer) residing in close proximity to the active semiconductor layer. One or more protect/passivation material layers are typically deposited or grown on the surface of the active semiconductor layer to provide functions such as low surface state density on the surface of active semiconductor layer, diffusion barrier for converter material or mobile ions or humidity, and/or to provide electrical insulation between the neutron converter layer material and the active semiconductor layer and metal electrodes. The lateral carrier transport and collection detector structure can be implemented using lateral PN detector, lateral PiN detector, lateral PNP detector, or lateral Schottky-Semiconductor-Schottky detector. These lateral detectors will typically be implemented in an interdigitated finger arrangement but can be implemented as a rectilinear detector or hexagonal detector cell arrangements. The SOI neutron detector structure can have an optional electrical contact to the handle substrate that provides an optimized voltage bias at the back surface of buried oxide layer. The optimized electrical bias voltage on the handle substrate can adjusted to minimize the detector capacitance (that is, bias of the handle substrate relative to the potential of the active semiconductor layer adjusted so that neither accumulation or inversion layer forms at either the top or bottom surface of the buried oxide) and reduce the carrier trapping in surface states on the top surface of the buried oxide layer.

The SOI neutron detector can detect either thermal neutrons or fast neutrons depending on the neutron converter layer that is used. The neutron converter layer for thermal neutrons can consist of a material that generates high energy alpha particle, high energy tritium particle, or high energy electrons when a neutron interacts with the converter material. The high energy alpha particle, high energy tritium particle, or high energy electrons will generate a large number of electron carriers and hole carrier in the active semiconductor layer that transport laterally to the carrier collecting electrodes. The generated hole carriers will be collected by the negative bias carrier collecting electrode and electron carriers will be collected by the positive bias carrier collecting electrode. The negative bias carrier collecting electrode can be at ground potential but also be any other potential. The time for the carriers to transport laterally is dependent on the lateral electric field. Material that is undepleted will have low lateral electric field and the carrier transport will be relatively slow (transport by diffusion). For many applications, it is desirable for the active semiconductor layer to be depleted and have a sufficient lateral electric field to transport the carriers by electric field drift to the carrier collecting electrode in a short time. A desirable lateral transport time is approximately on the order of 10 to 100 nanoseconds (rise time of neutron detector response of 10 to 100 nanoseconds), but useful neutron detectors can be implemented for somewhat longer lateral carrier transport times (rise time of detector response less than approximately 10 microseconds).

The neutron converter layer for detecting fast neutrons will typically be a material that has a high concentration of hydrogen such as polyethylene that generates high energy protons when the neutrons interact with the hydrogen in the converter material. The high energy protons will generate hole and electron carriers in the active semiconductor layer that can then transport laterally and be detected by the carrier collecting electrode.

The neutron to high energy particle converter layer (neutron converter layer) that generates high energy alpha particles, tritium particles, proton particles, or lithium nucleus residing in close proximity to the active semiconductor layer will typically be implemented by depositing the neutron converter layer on one or more protect/passivation material layers that are deposited or grown on the active semiconductor layer. The purpose of the material layers deposited or grown on the active semiconductor layer can be to achieve low surface state density on the surface of the active semiconductor layer to enable low leakage current and low carrier trapping' act as a diffusion barrier to the converter layer material (for example, a barrier layer is needed to prevent lithium converter material diffusing into the active semiconductor layer), act as a diffusion barrier to mobile ions such as sodium, act as a hermetic barrier layer to prevent diffusion of humidity to the active semiconductor layer, provide electrical insulation between converter material layer and the active semiconductor layer, and/or a combination of the above functions.

The silicon-on-insulator structure consists of an active semiconductor layer (for example silicon semiconductor layer) a buried silicon oxide or insulator (for example, a silicon nitride or combination of insulator layers layer), and a handle silicon substrate. The buried silicon oxide layer performs the function achieving a low surface state density on the back surface of the active semiconductor layer, acts as a potential barrier that prevents gamma ray generated electron and hole carriers in the handle substrate from transporting into the active semiconductor layer, and thirdly, can help reduce the detector capacitance for thick buried silicon oxide (insulator) layers. For example, greater than 0.5 nm of buried silicon oxide insulator thickness is used to implement sufficient potential barrier that to block carriers generated in the handle substrate from transporting into the active semiconductor layer. A thick buried silicon oxide insulator can be used to reduce the detector capacitance. The dielectric constant of silicon oxide is 3.95 while the dielectric constant of silicon is 11.9. Thus, a given thickness of silicon oxide is approximately equal to a depleted silicon layer that that three times the oxide thickness in terms of the ability to reduce detector capacitance. There are commercial approaches such as high pressure and long time thermal oxide growth that are well known in the industry of growing thermal oxides with as much as 35 microns of silicon oxide thickness for the buried oxide layer. In addition, there are methods know in the industry of growing low stress thermal oxides. In addition, there are methods know in the industry of depositing thick oxides by chemical vapor deposition, plasma enhanced chemical vapor deposition, and sol gel techniques. It is possible to form the thick oxide on both the handle wafer and the wafer from which the active semiconductor layer will be formed prior to the wafer bonding step that is normally used to make silicon-on-insulator substrates. Sometimes the surface is chemical mechanical polished of the oxide prior to bonding to reduce surface roughness of the oxide layer. Thus, the total oxide thickness can be 100 um or greater if desired. It is also possible that the insulator layer can have combinations of silicon oxide, silicon nitride, or metal oxide layers. Thus, the buried oxide layer in the range of 0.5 nm to greater than 100 microns will be useful for the implementing neutron detectors that achieve gamma ray isolation and lower detector capacitance.

The handle substrate can be a silicon substrate but can be other materials such as quartz, glass, sapphire, semi-insulating material, high resistivity semiconductor material, gold doped silicon semi-insulating material, high resistivity epitaxial semiconductor material on single crystal semiconductor material, non-crystalline material, polycrystalline material, porous silicon on single crystal silicon, oxidized porous silicon on single crystal silicon, polymer material, metal material, stainless steel, flexible material, or composite substrate comprising more that one of the above material combinations. The lowest detector capacitance can be for the case that the handle substrate is insulating, semi-insulating, or high resistivity. Silicon float zone crystal growth techniques are typically used to achieve high resistivity silicon substrates. High resistivity silicon float zone wafers are readily available at 150 mm diameter and silicon float zone wafers at 200 mm diameter have been demonstrated, however, there are no high resistivity silicon float zone wafers at 300 mm diameter.

A novel way of obtaining a semi-insulating handle substrate that is compatible with wafer diameters to 300 mm or greater is to fabricate the SOI neutron detector using a conventional VLSI foundry process using a standard SOI wafer having silicon active layer and silicon handle substrate and then as one of the last steps in the process (typically in a different facility) diffuse gold into the handle substrate. The gold will generate deep levels in the silicon and convert the silicon to semi-insulating material. The semi-insulating material can be advantageous since it should have reduced detector capacitance.

A second method of obtaining a high resistivity semiconductor layer in the handle substrate that resides beneath the buried oxide layer that is compatible with wafer diameters to >300 mm is to grow high resistivity, thick (in range of 1 um to 200 um thick) silicon epitaxial layer on a silicon substrate that forms a composite handle substrate. This composite handle substrate can then be used to form a SOI wafer that has high resistivity material beneath the buried oxide using standard SOI wafer bonding fabrication approaches such as Smart-Cut™ and Unibond™. A composite substrate that consist of a porous silicon layer or oxidized porous silicon layer formed on the surface of a conventional silicon substrate can also be used to implement a thick, insulating layer on the handle substrate prior to wafer bonding to form the SOI substrate.

The active semiconductor material can be single-crystal semiconductor material (for example silicon). The lowest detector capacitance for a given bias voltage can be achieved by having low doping concentration (high resistivity) in the active semiconductor layer. High resistivity silicon float zone wafers are readily available at 150 mm diameter and silicon float zone wafers at 200 mm diameter have been demonstrated, however, there are no high resistivity silicon float zone wafers at 300 mm diameter. A method of obtaining a high resistivity active semiconductor layer that is compatible with wafer diameters to 300 mm or greater is to grow high resistivity, thick (in range of 1 um to 100 um thick) silicon epitaxial layer on a silicon substrate. This silicon substrate can then be used to form a SOI wafer that has high resistivity active semiconductor using standard SOI wafer bonding fabrication approaches such as BESOI, SmartCut™ and Unibond™. The active semiconductor material layer can have a thickness in the range of approximately 50 nm to greater than 100 microns.

It is desirable that the leakage current be low to sense low levels of carrier generated charge because the leakage current contributes shot noise to the input of the sensing amplifier. This is the case for large neutron detector arrays comprising many positive or negative bias carrier collecting electrodes connected to a single amplifier node. Thus, long minority carrier lifetime (low leakage current generation) in the active semiconductor layer is advantageous for large neutron detector arrays. Special silicon-on-insulator fabrication procedures can be used to increase the minority carrier lifetime in the active semiconductor layer. The typical way of fabricating a silicon-on-insulator wafer for the case that the active semiconductor layer thickness is greater than approximately 0.5 microns is to first thermally oxidize the surface of the wafer from which the active semiconductor layer will be formed, to achieve low surface state density on this surface, wafer bond the oxidized surface to a handle substrate, and then grind and polish the wafer from which the active semiconductor layer from the back side will be formed to the desired thickness.

A gettering step can be added to the silicon-on-insulator process to achieve high carrier lifetime in the active semiconductor layer. A process for performing the getter is to prior to the grinding and polishing process, create damage and/or precipitates at the backsurface of the wafer from which the active semiconductor layer will be formed which will act as site to which heavy metals such as gold and iron can diffuse and be trapped which the wafer is heated to approximately greater than 600 C. There is a number of approaches for forming this getter damage layer but one of the very effective approaches is POCL or phosphorous diffusion gettering. This getter layer is then removed in the grind and polish step, also removing the heavy metals that have diffused to the getter layer.

Another way to reduce the leakage current in the active semiconductor layer is to have both the front and back surface of the active semiconductor layer either accumulated or alternately inverted with an inversion layer. The leakage current will be minimized for either of these two conditions. The condition of accumulation or inversion can be achieve by adding dopants near the surface of the active semiconductor layer and/or appropriately biasing the optional electrical contact that is made to the handle substrate. For N-type active semiconductor layer, the back surface of the active semiconductor layer can be accumulated by applying a negative bias to the optional electrical contact on the handle surface.

Because the volume of material in the active semiconductor layer is small, silicon-on-insulator detectors typically have the ability to operate at high temperatures without generating excessive leakage currents.

The lowest detector capacitance for a given bias voltage can be achieved by having low doping concentration (high resistivity) both in the active semiconductor layer and the handle substrate. The depletion layer will extend from the bias carrier collecting electrode both laterally in the active semiconductor layer and vertically through the buried oxide layer into the handle substrate. Since the capacitance is largely determined by the width of the depletion layer in both the lateral and vertical dimension, the capacitance will be lowest for large lateral and vertical depletion widths.

The SOI neutron detector structure can have an optional electrical contact to the handle substrate that provides an optimized voltage bias at the back surface of buried oxide layer relative to the potential of the active semiconductor layer. The optimized bias on the handle substrate can be adjusted to minimize the detector capacitance. One of the optimized bias conditions for the handle substrate is such that that neither an inversion layer or accumulation layer exist at the backsurface of the active semiconductor layer at the buried oxide interfaces.

For N-type active semiconductor layer, a sufficiently positive bias applied to the handle substrate relative to the bias of the active semiconductor layer, will accumulate the backsurface of the active semiconductor layer. In addition, a sufficiently negative bias will invert the backsurface of the active semiconductor layer. The lowest capacitance is achieved for a bias voltage in between the accumulation and inversion bias voltage. For an N-type active semiconductor layer, the preferred bias voltage on the handle substrate to neither form an accumulation or inversion layer at the backsurface of the active semiconductor layer is such that the handle substrate is more negative bias than the voltage needed to achieve flat band conditions but not sufficiently negative biased that an inversion layer forms. The addition of thin doping layers, either N-type or P-type, at the backsurface of the active semiconductor layer can adjust the voltage necessary on the handle substrate to achieve the condition of neither accumulation or inversion layer forming at the backsurface of the active semiconductor layer. These thin doping layers can be implemented in the silicon-on-insulator manufacturing process by forming these thin doping layers on the surface of the substrate from which the active semiconductor layer will be formed prior to the wafer bonding step.

The doping type and thickness is readily apparent to those skilled in the art. An inversion or accumulation layer can also form on the top surface of the handle substrate adjacent to buried oxide layer. If the buried oxide layer is thick, then the affect of the accumulation or inversion layer at the top surface handle substrate on the detector capacitance will be reduced. There is also a bias voltage on the handle substrate relative to the active semiconductor layer for which neither an accumulation or inversion layer is formed on the top surface of the handle substrate. The addition of thin doping layers, either N-type or P-type, at the backsurface of the active semiconductor layer can adjust the voltage necessary on the handle substrate to achieve the condition of neither accumulation or inversion layer forming at the backsurface of the active semiconductor layer. These thin doping layers can be implemented in the silicon-on-insulator manufacturing process by forming these thin doping layers on the surface of the substrate from which the active semiconductor layer will be formed prior to the wafer bonding step. The doping type and thickness is readily apparent to those skilled in the art. The handle substrate can be either N-type or P-type and the dopant type can be selected to best achieve the condition of neither accumulation or inversion layer forming on the top surface of the handle substrate depending on the bias voltage used the handle substrate.

The lateral SOI neutron detector allows for an active semiconductor (silicon) layer that allows large lateral separation of the positive bias carrier collecting electrode and the negative bias carrier collecting electrode to achieve reduced capacitance. It is advantageous for achieving large lateral depletion width at low bias voltage if the active semiconductor layer has a low doping concentration (ie, high resistivity).

There are several approaches for implementing the positive bias carrier collecting electrode and the negative bias carrier collecting electrodes. Positive bias carrier collecting electrode can consist of N-type doped region in active semiconductor layer and the negative bias carrier collecting electrode can consist of P-type doped region in the active semiconductor layer. The active semiconductor layer will normally be N-type doping for this arrangement of carrier collecting electrodes, but can be either N-type doping or P-type doping. One advantage of the active semiconductor layer being doped N-type is that a positive fixed oxide charge is normally in a silicon dioxide layer on a silicon surface and this positive oxide charge will typically accumulate the surface of the N-type silicon. If instead, the active semiconductor layer were P-type, inversion layers would be formed at the surface. Special design considerations such as doped channel stops have to be used when inversion layers are on the surface to avoid the inversion layers enhancing the leakage current to the collecting electrodes.

Another embodiment can have a positive bias carrier collecting electrode which consists of P-type doped region in semiconductor active layer and the negative bias carrier collecting electrode can consist of P-type doped region in the semiconductor active layer. The semiconductor active layer will normally be N-type doping. In this carrier collecting electrode arrangement, when one of the carrier collecting electrodes is negatively biased, a depletion region is formed within the semiconductor active layer. For a sufficiently negative bias (approximately PN junction turn-on voltage) on one of the carrier collecting electrodes, the second P-type doped will forward bias and establish the potential of the semiconductor active layer. The most negatively biased carrier collecting electrode will collect holes that are generated by the high energy particles and the most positively biased electrode will collect the electrons that are generated by the high energy particles.

Another embodiment includes a positive bias carrier collecting electrode which consists of N-type doped region in semiconductor active and the negative bias carrier collecting electrode can consist of N-type doped region in the semiconductor active layer. The semiconductor active layer will normally be P-type doping. The neutron detector will operate similarly to the above description.

Another embodiment includes a positive bias carrier collecting electrode comprising Schottky Metal contact to semiconductor active and the negative bias carrier collecting electrode can consist of Schottky the semiconductor active layer. The semiconductor active layer will normally be N-type doping. In this carrier collecting electrode arrangement, when one of the carrier collecting electrodes is negatively biased, a depletion region is formed within the semiconductor active layer. For a sufficiently negative bias (approximately Schottky junction turn-on voltage) on one of the carrier collecting electrodes, the second P-type doped will forward bias and establish the potential of the semiconductor active layer. The most negatively biased carrier collecting electrode will collect holes that are generated by the high energy particles and the most positively biased electrode will collect the electrons that are generated by the high energy particles.

The neutron to high energy particle converter layer can be deposited either directly on top of the semiconductor active layer or is separated from the semiconductor active layer by an electrically insulating dielectric layer.

If the converter layer has a low sheet resistance, an electrically insulating dielectric layer will be deposited overtop of the positive bias carrier collecting electrode, the negative bias carrier collection electrode, and the surface of the active semiconductor layer so that there is not a low resistance path between the positive and negative bias collecting electrode that would lead to a high conduction of current.

The conversion layer for neutron to high energy alpha particle can consist of materials such as 10 boron, 10 boron carbide, 10 boron phosphide, 6 lithium fluoride, 6 lithium. The conversion layer for neutron to high energy electrons can consist of cadmium and or gadolinium, gadolinium phosphate, gadolinium oxide.

The neutron to high energy particle conversion layer can consist of one material type or consist of multiple material types.

For certain conversion layers such as 6 lithium, it is necessary to have a material layer that acts as a diffusion barrier between the 6 lithium converter material and the active semiconductor layer since lithium in silicon acts as a recombination center for free hole and electron carrier. 6 Lithium will diffuse at room temperature through many materials such as silicon dioxide. Materials that act as diffusion barriers include aluminum oxide and other diffusion barrier materials. The diffusion barrier material can be used as the electrically insulating dielectric layer or can be used in combination with another electrically insulating dielectric layer.

For certain conversion layers such as 6 lithium, it is necessary to coat the conversion layer with a material layer that prevents the diffusion of oxygen to the 6 lithium layer. Materials such as silicon nitride, aluminum oxide, or laminated metal polymer material layers can act as an oxygen diffusion barrier.

To achieve a fast response for the lateral SOI neutron detector, it is generally suggested that a low resistivity metal layer be in contact with the positive bias carrier collecting electrode for the long length of the electrode.

Additional reduction in capacitance can be achieved by using a high resistivity semiconductor as the SOI handle wafer, substrate beneath the buried oxide active layer.

Additional reduction in capacitance can be achieved by appropriately biasing of the SOI handle wafer relative to the negative bias carrier collecting electrode to create a depletion layer in the handle substrate.

A reduction of the bias voltage needed to deplete the active semiconductor layer can be achieved by adding a lightly doped P-type layer at the surface of the N-type active semiconductor layer that is in contact with the negative bias carrier collecting electrode with an integrated doping that approximately equals the integrated doping in the N-type layer that depletes with sufficient negative bias. When a negative bias is applied to the negative biase carrier collecting electrode, a depletion layer will be formed in both the lightly doped P-type layer and the N-type active semiconductor layer. At sufficient bias, both the lightly doped P-type layer and the N-type active layer will be completely depleted resulting in low capacitance.

Lateral neutron detector with non-continuous neutron converter material layer in the lateral direction to reduce the possibility of electrical shorts through pin holes in the Protect/passivation layer that would make the neutron detector non functional to enable large area neutron detectors A buried channel conduction of generated carriers laterally to the bias collecting electrodes can be desirable to eliminate interaction of the carrier with surface states in the oxide that can result in trapping and loss of the carrier. A buried potential well in which electrons can transport laterally without being trapped by the surface states can be implemented by having a lightly doped P-type layer at both the top surface of the N-type semiconductor active layer. A lightly doped P-type layer at the back surface of the active semiconductor layer can also help confine the electrons that transport laterally to a buried layer transport. Alternately, a buried potential well in which holes can transport laterally without being trapped by the surface states can be implemented by having a lightly doped N-type layer at both the top surface of a P-type semiconductor active layer. A lightly doped N-type layer at the back surface of the active semiconductor layer will also help confine the holes that transport laterally to a buried layer transport.

Buried channel conduction of generated electrons or holes can be achieved by including a heterojunction that confines the carrier transport to within a potential well. One approach of implementing a heterojunction that confines holes to a potential well so that they do not interact with surface states is to have an active semiconductor layer that consist of a silicon layer at the back surface and the top surface of the active semiconductor layer and a silicon germanium layer in between the two silicon wafer (the silicon and silicon germanium would have the same doping type either N-type or P-type). There is a valence band offset layer of silicon germanium relative to silicon and this arrangement will form a potential well for lateral hole transport without interacting with surface states that exist at the silicon-silicon oxide interface.

The neutron detector efficiency of the active semiconductor layer is increased by etching trench recesses either partially or entirely through the semiconductor active layer to the buried oxide layer and depositing the neutron conversion material layer on the sides of the trench recesses or partially or fully to fill the trench recesses. The active semiconductor layer can have a thickness in the range of 50 nm to greater than 100 microns. It can be desirable for thermal neutron detection to have a deep, high aspect ratio trench filled with the neutron converter material and to have the trenches spaced closely together with active semiconductor layer material between the trenches. The trench can be etched by deep Reactive Ion Etching or laser ablation. The width of the trench can be as small as 200 nm wide. The preferred width of the trench depends on the neutron converter material that is used. It can be desirable that the neutron converter material be deposited conformally on the surface of the trench. Neutron converter material deposition methods include atomic layer deposition, chemical vapor deposition, sputtering, electron beam deposition, electroplating, and deposition of powders into the trenches. Several examples of converter material that can be put into the trenches include 6LiF, 10 boron, boron oxide, and 10 boron carbide. The powders may be combined with a polymer binder material. The powders can also be placed in the trench and then sealed with a top capping layer. Materials such as 10 boron can be diffused into the sides of the trench to form 10 boron silicide. Neutron converter layers such as lithium can be electroplated on a metal seed layer that coat the sides of the trenches. The trench recesses can be spaced as near as 1 um and as far apart as 200 um depending on the conversion layer used. The efficiency of the neutron detector can generally improve the deeper the recesses are into the semiconductor active layer.

Fast rise time amplifier is used to transduce the signal from the carriers generated by the high energy alpha, electron, or proton particles produced by the conversion layer generated carriers to generally a voltage signal. The amplifier can be a charge amplifier, charge-to-voltage amplifier, current amplifier, or current-to-voltage amplifiers. The amplifier can be integrated monolithically with the lateral neutron detector in the active semiconductor layer or can be external to the semiconductor neutron detector (non-monolithic). In both cases, it is desirable to minimize parasitic capacitances. The amplifiers can be connected to either or both the positive bias carrier collecting electrode or the negative bias carrier collecting electrode. It can be the case that multiple positive bias carrier collecting electrodes or multiple negative bias carrier collecting electrodes are connected together to the input to the amplifier. It can be the case that the amplifier is connected to either the multiple positive bias carrier collecting electrodes or the negative bias carrier collecting electrode. If the capacitance of the lateral neutron detector and parasitic capacitance is sufficiently small, as few as one amplifier is needed to transduce the signal from generated carriers for an entire director array that can consist of many positive bias and negative bias carrier collecting electrodes. Alternately, multiple amplifiers can be used to transduce the signal from the entire neutron detector array with each amplifier connected to approximately equal numbers of positive bias or negative bias carrier collecting nodes.

A neutron imager can be implemented by a two dimensional array of neutron detectors with Y-direction electrical bus connecting the vertical columns and X-direction vertical bus connecting the horizontal columns with fast readout amplifiers on each bus to provide X-Y information on the location of the neutron carrier generation location.

A 100 $cm^2$ detector array design can be configured as strip detector with up to 32 detector elements and depending on experimental measurements of the SOI detector capacitance. The design can be modified to 10 detector strip elements or less.

Example for Thermal Neutron Detector Array: The thermal neutron detector is implemented by depositing a neutron converter material layer (boron-10 film or 6LiF or 6 lithium layer or combinations of material layer) over top a protect/passivation material layer of an SOI lateral PiN interdigitated finger detector as shown in the FIG. 7. For the case of boron-10, thermal neutrons will be captured within the boron-10 layer and emit Li ions and 1.472 MeV alpha particles. The high energy alpha particle will generate hole and electron carriers in the thin active silicon device layer. The generated holes transporting laterally to the negative bias carrier collecting electrode and the generated electrons transporting laterally to the positive bias carrier collecting electrodes. The range for the alpha particles in silicon is ≈5.7 µm and thus a SOI detector layer thickness of 7 µm is appropriate for 10 boron. A different silicon layer thickness will be selected for the case of 6LiF and 6 lithium since this converter material emits higher energy alpha particles and tritium when a neutron interacts with the converter film. An SOI structure is used to minimize the detector sensitivity to electron and hole carriers generated in the handle substrate by gamma rays. Electron-hole pairs that are generated by gamma rays in the thick handle substrate cannot diffuse into the thin SOI device layer because of the buried oxide layer.

The SOI lateral PiN interdigitated neutron detector will consist alternating fingers of narrow (7 µm) and long (10 cm) P+ and N+ dopant made into the 7 um thick, high resistivity (>10,000 ohm-cm) active silicon device layer. The terminals of the interdigitated finger detector are biased to deplete the high resistivity silicon both laterally and vertically. A lateral electric field is generated that will laterally transport alpha particle generated hole and electron carriers to the terminals (holes to the P+ junction and electrons to the N+ junction). Aspects of the SOI lateral PiN detector are to 1) minimize detector capacitance to enable large area neutron detectors while maintaining acceptable readout amplifier noise performance, 2) obtain carrier transit time less than approximately 10 ns, 3) optimize the electric field distribution to allow high voltage without breakdown, 5) optimize protect/passivation SiO2 thickness (≈0.6 µm) between the boron-10 layer and the silicon device layer over the detector to enable high transmission probability of 1.472 MeV alphas into the silicon device layer, and 5) optimize boron-10 thickness to improve efficiency. The 7 µm active semiconductor silicon layer can be laterally depleted >10 µm and that high electric fields exist to transport the carriers laterally. The goal for the lateral SOI detector will be to deplete greater than 30 um-60 um laterally while achieving high collection efficiency and short transit time. There are several novel ideas to improve the electric field distribution such as doping in P-type layer approximately equals doping in N-type device layer so that the layers deplete at low voltages comprising a lightly doped boron layer at the surface of the thin SOI active device layer that automatically deplete the N− device layer for a small amount of bias to enable increased lateral separation between the P+ and N+ junctions. The lightly doped boron layer also reduces the surface electric field enabling higher bias voltage to increase vertical and lateral depletion widths to further reduce capacitance.

One key aspect is minimizing the SOI detector capacitance. The use of high resistivity (>10,000 ohm-cm) silicon in both the active semiconductor device layer and the handle substrate will allow the detector to have large vertical and lateral depletion widths which is key to achieving low capacitance. An interdigitated lateral PiN detector with separation between the narrow (7 µm) P+ and N+ junction of 30 µm to 60 µm also has the feature of having low capacitance. A voltage of 50V on the P+ junction would result in a vertical depletion width of ≈250 µm into the substrate and a voltage of 100V on the P+ junction would result in a depletion width of ≈350 µm into the substrate. A combination of large depletion width and narrow P+ and N+ junctions can result in low detector capacitance.

The optimal thickness of boron-10. For example, the optimal thickness of the boron-10 layer is determined as shown in the FIG. 7 sketch. Although the number of alpha particles created increases with the thickness of boron-10, if there is too much boron-10, the alphas will not escape the boron-10 and enter the active silicon layer for detection. In addition, it is desirable to minimize the amount of dielectric between the boron-10 layer and the silicon active detection layer since alpha particles can be lost in dielectric layers and not contribute to the detector signal. In addition to optimum thickness of boron-10 layer, a bilayer approach using boron-10/$^6$LiF can be utilized to enhance efficiency.

One approach to improve efficiency can be to etch trench recesses either partially or fully through the active semiconductor layer and then partially or completely fill the trench recesses with neutron converter material. A high density of holes or trench recesses partially or completely through the active semiconductor layer thickness using conventional VLSI processes (many SOI VLSI processes often have vertical trenches completely through the silicon to provide isolation).

The SOI detectors are compatible with fabrication at commercial CMOS foundries.

Example SOI neutron detector mask designs, are shown at the right in FIG. 9 for a 4-inch wafer with 5.3 cm long test strip detector designs. This mask contains strip detectors with various P+ to N+ spacing ranging from 10 µm to 60 µm. Layout of an SOI neutron detector array with five strips 700 µm wide with 60 µm between narrow P+ and N+ junctions (53 mm long) is shown on the right in FIG. 9. It should be understood by one skilled in the art of semiconductor neutron detectors that the collection efficiency can be improved by stacking active semiconductor layers or stacking substrates containing active semiconductor layers. The substrates containing active semiconductor layers can be stacked face to face with a neutron converter material layer between the two active semiconductor layers to enhance the neutron detector efficiency. The substrates containing active semiconductor layer, buried oxide layer handle substrate, and neutron converter material layers can also be stacked vertically to increase the neutron detector efficiency. In addition, it is possible to stack the active semiconductor layer/converter layer by removing the handle substrate after each bonding operation.

Electronics: The number of amplifiers that will be used to readout the detector signal. If the detector capacitance is sufficiently low, only one or several readout amplifiers will be required to readout an area of 10 cm×10 cm. Initial detector arrays can be designed with 32 strips and can be modified to ten or smaller number of strips depending on detector capacitance and signal level. Currently available laboratory electronics can be used to evaluate initial arrays. Commercial readout amplifiers such as IDE AS readout amplifiers are available for readout of large tiled detector arrays.

Further features of this detector approach include low capacitance achieved by using high resistivity (>10,000 ohm-cm) silicon material for both the thin active semiconductor device layer and thick silicon handle substrate that enable large depletion widths, large area 10 cm×10 cm detector array (100 cm$^2$ per array), and low cost using 150 mm diameter CMOS/CCD foundry. Cost can be less for volume production since the SOI neutron detector is a simple process with six mask process steps while modern VLSI typically have as many as 30 masking steps.

Furthermore this approach is compatible with higher temperature operation due to reduced volume for leakage current generation for thin SOI device layer, is compatible with future on-chip CMOS readout amplifiers, and has fast transient response to enable neutron counting Very Large Neutron Detector Arrays can be implemented by assembling the 100 cm² arrays into arrays of 1 m² or larger.

The SOI thermal and fast neutron detector arrays can provide an important breakthrough in the detection of shielded Special Nuclear Material (SNM). It can provide a prototype unit that is rugged, low cost, large area, and the capability to detect both fast and thermal neutrons. For passive detection, the performance can be estimated for Plutonium since Uranium emits (almost) no neutrons.

The fast neutron emission flux from Pu-239 (with 7% Pu-240 contamination) is approximately 60 000 neutrons/kg. At a 2 meter distance, that is a flux of ~0.1 fast neutrons/cm²/second, assuming no interaction along the way. The neutrons interact in air, so the fast neutron flux is lower than this. Most fast neutron detectors use a layer of high density polypropylene (HDPE) as a converter layer. Even for 1 mm thickness of HDPE, the efficiency of neutrons generating protons is sub one percent. Thus, it is important to have large area detectors and consider stacking detectors to improve efficiency. The array that can be fabricated by the approach described herein can have 100 cm² area. These arrays can be tiled into large arrays of 1 m² or larger and stacked for improved detection efficiency. Very large neutron detector array would be invaluable as a portal monitor. This SOI detector can also detect thermal neutrons. The flux of thermal neutrons is less, however, the detector efficiency can be larger. It is suggested that thermal neutron detector efficiencies of 10-13% can be obtained using approaches of sandwiched boron-10 coated detectors or bi-layers of boron-10 and $^6$LiF. Although somewhat more complicated, even higher efficiencies can be obtained if use arrays of high density of vertical holes etched in detector material that are coated with boron-10 ("dimpled" array approach). One advantage of the SOI detector array described herein compared to previous GaAs detectors is somewhat large detection area and manufacturing by commercial VLSI process.

A neutron detector with an area of 100 cm² is well suited to typical size of hand held neutron detector detectors. The technology being described herein enables a hand held detector array with both fast neutron and thermal neutron detection capability. Other features of the proposed solid-state SOI neutron detector are that it would enable hand-held detectors that are light weight, low power, rugged, and relatively inexpensive.

An active neutron interrogation system in which 14 MeV neutron irradiates a container can potentially be used to detect the presence of uranium-235. Both highly enriched uranium (HEU) and plutonium will fission if struck by a neutron beam. Hence, neutron counting can be coupled with bombarding the sample with a neutron beam, to count the neutrons from the induced fissions. An active approach can measure both U-235 and Pu-239.

A similar 10 cm×10 cm array can be fabricated, however, it can be fabricated on silicon-on-insulator layers using a top thin silicon layer as the detection layer. The thin silicon layer will have a factor of 70 less volume and will reduce the gamma ray signal by a factor of 70.

The lateral neutron detector can be operated in integrate and reset operating mode in which generated carriers from the high energy alpha, electron, or proton particles produced by the neutron conversion layer are integrated on a high impedance node and the voltage resulting from the integration of the carriers is sensed. After a specified time, the high impedance node is reset with a reset transistor to a given potential and the integrating of carriers begins for a sequential integration period. The high impedance node can be a charge amplifier that is reset or a gate of a MOSFET amplifier that is reset. The MOSFET can be operated as a voltage amplifier in the source-follower voltage amplifier configuration or in the common-source voltage amplifier configuration. The amplifier can be integrated monolithically with the lateral neutron detector in the active semiconductor layer or can be external to the semiconductor neutron detector (non-monolithic). In both cases, it is desirable to minimize parasitic capacitances. The amplifiers can be connected to either or both the positive bias carrier collecting electrode or the negative bias carrier collecting electrode. It can be the case that multiple positive bias carrier collecting electrodes or multiple negative bias carrier collecting electrodes are connected together to the input to the amplifier. It can be the case that the amplifier is connected to either the multiple positive bias carrier collecting electrodes or the negative bias carrier collecting electrode. If the capacitance of the lateral neutron detector and parasitic capacitance is sufficiently small, as few as one amplifier is needed to transduce the signal from generated carriers for an entire director array that can consist of many positive bias and negative bias carrier collecting electrodes. Alternately, multiple amplifiers can be used to transduce the signal from the entire neutron detector array with each amplifier connected to approximately equal numbers of positive bias or negative bias carrier collecting nodes.

The active semiconductor material can be single-crystal semiconductor material but can be polycrystalline material such as polycrystalline silicon material, amorphous material such as amorphous silicon material, hydrogenated polycrystalline material such as hydrogenated silicon material, hydrogenated amorphous material such as hydrogenated amorphous silicon material.

The neutron to high energy particle converter layer residing in close proximity to the active semiconductor layer can also be implemented as a foil material place in close proximity to the active semiconductor layer.

Many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What we claim is:

1. A silicon-on-insulator (SOI) neutron detector comprising:
   a silicon-on-insulator structure,
      wherein the silicon-on-insulator structure consists of
         an active semiconductor layer,
         a buried layer consisting of one selected from the group consisting of a silicon oxide, an insulator, a silicon nitride, a metal oxide, and combinations thereof, and
         a handle substrate;
   a lateral carrier transport and collection detector structure within the active semiconductor layer of the silicon-on-insulator structure; and
   a neutron to high energy particle converter layer to generate energetic particles above the active semiconductor layer;
      wherein the lateral carrier transport and collection detector structure within the active semiconductor layer of the silicon-on-insulator structure has a high immunity to gamma ray generated carriers, wherein the lateral carrier transport and collection detector structure within the active semiconductor layer of the silicon-on-insulator structure has a fast rise time neutron detector response, wherein the lateral carrier transport and collection detector structure within the active semiconductor layer of the silicon-on-insulator structure can detect either a thermal neutron or a fast neutron.

2. The silicon-on-insulator (SOI) neutron detector of claim 1 wherein the lateral carrier transport and collection detector structure within the active semiconductor layer of the silicon-on-insulator structure has a low capacitance to enable high detector sensitivity and a large area neutron detector.

3. The silicon-on-insulator (SOI) neutron detector of claim 1 wherein the lateral carrier transport and collection detector structure within the active semiconductor layer of the silicon-on-insulator structure has a high collection efficiency for energetic particles.

4. The silicon-on-insulator (SOI) neutron detector of claim 1 further including a protect/passivation material layer on the active semiconductor layer wherein the protect/passivation material layer provides a low surface state density on the surface of the active semiconductor layer, a diffusion barrier for the converter layer or mobile ions or humidity or an electrical insulation between the neutron to high energy particle converter layer and the active semiconductor layer and a metal electrode.

5. The silicon-on-insulator (SOI) neutron detector of claim 1 wherein the lateral carrier transport and collection detector structure is implemented using one selected from the group consisting of a lateral PN detector, a lateral PiN detector, a lateral PNP detector, and a lateral Schottky-Semiconductor-Schottky detector.

6. The silicon-on-insulator (SOI) neutron detector of claim 5 wherein the lateral carrier transport and collection detector structure is implemented in an interdigitated finger arrangement.

7. The silicon-on-insulator (SOI) neutron detector of claim 5 wherein the lateral carrier transport and collection detector structure is implemented as a rectilinear detector or hexagonal detector cell arrangement.

8. The silicon-on-insulator (SOI) neutron detector of claim 1 wherein the SOI neutron detector has an electrical contact to the substrate that provides a voltage bias at the back surface of the buried oxide layer.

9. The silicon-on-insulator (SOI) neutron detector of claim 8 wherein the voltage bias on the substrate can be adjusted to minimize the detector capacitance.

10. The silicon-on-insulator (SOI) neutron detector of claim 8 wherein the bias can be adjusted so that neither an accumulation or an inversion layer forms at either the top or bottom surface of the buried oxide, and reduce the carrier trapping in surface states on the top surface of the buried oxide layer.

11. The silicon-on-insulator (SOI) neutron detector of claim 1 wherein the neutron to high energy particle converter layer for thermal neutrons comprises a material that generates a high energy alpha particle or a high energy electron when a neutron interacts with the neutron to high energy particle converter layer.

12. The silicon-on-insulator (SOI) neutron detector of claim 11 wherein the high energy alpha particle or the high energy electron generates a large number of carriers in the active semiconductor layer that transport laterally to the carrier collecting electrodes.

13. The silicon-on-insulator (SOI) neutron detector of claim 1 wherein the lateral transport time is approximately on the order of 10 nanoseconds.

14. The silicon-on-insulator (SOI) neutron detector of claim 1 wherein the lateral transport time is approximately on the order of greater than 10 nanoseconds.

15. The silicon-on-insulator (SOI) neutron detector of claim 1 wherein the neutron to high energy particle converter layer is a material that has a high concentration of hydrogen and wherein the neutrons interact with the hydrogen in the converter material to generate high energy protons.

16. The silicon-on-insulator (SOI) neutron detector of claim 1 wherein the neutron to high energy particle converter layer for detecting fast neutrons is polyethylene.

17. The silicon-on-insulator (SOI) neutron detector of claim 1 wherein leakage current in the active semiconductor layer is reduced by having both the front and back surface of the active semiconductor layer either accumulated or inverted with an inversion layer.

18. The silicon-on-insulator (SOI) neutron detector of claim 17 wherein the depletion layer will extend from the bias carrier collecting electrode both laterally in the active semiconductor layer and vertically through the buried oxide layer into the handle substrate.

19. The silicon-on-insulator (SOI) neutron detector of claim 1 wherein the lateral carrier transport and collection detector structure includes a positive bias carrier collecting electrode and a negative bias carrier collecting electrode and wherein the positive bias carrier collecting electrode consists of N-type doped region in the semiconductor active layer and the negative bias carrier collecting electrode consists of a P-type doped region in the semiconductor active layer.

20. The silicon-on-insulator (SOI) neutron detector of claim 1 wherein the lateral carrier transport and collection detector structure includes a positive bias carrier collecting electrode and a negative bias carrier collecting electrode and wherein the positive bias carrier collecting electrode consists of P-type doped region in semiconductor active layer and the negative bias carrier collecting electrode consists of P-type doped region in the semiconductor active layer and wherein one of the carrier collecting electrodes is negatively biased forming a depletion region within the semiconductor active layer.

21. The silicon-on-insulator (SOI) neutron detector of claim 1 wherein the neutron to high energy particle converter layer is separated from the active semiconductor layer by a first electrically insulating dielectric layer.

22. The silicon-on-insulator (SOI) neutron detector of claim 1 further including a second electrically insulating dielectric layer on a positive bias carrier collecting electrode, a negative bias carrier collection electrode, and the surface of the active semiconductor layer so that there is not a low resistance path between the positive and negative bias collecting electrode that would lead to a high conduction of current.

23. The silicon-on-insulator (SOI) neutron detector of claim 1 wherein the neutron to high energy particle converter layer comprises one selected from the group consisting of 10 boron, 10 boron carbide, 10 boron phosphide, 6 lithium fluoride, 6 lithium, and combinations thereof.

24. The silicon-on-insulator (SOI) neutron detector of claim 1 wherein the neutron to high energy particle converter layer comprises one selected from the group consisting of cadmium, gadolinium, gadolinium phosphate, gadolinium oxide, and combinations thereof.

25. The silicon-on-insulator (SOI) neutron detector of claim 1 further including etched trench recesses either partially or entirely through the active semiconductor layer and the neutron to high energy particle converter layer deposited on the sides of the trench recesses or partially or fully to fill the trench recesses.

26. A method of making a silicon-on-insulator (SOI) neutron detector comprising:
   providing a silicon-on-insulator structure,
      wherein the silicon-on-insulator structure consists of
         an active semiconductor layer,
         a buried layer consisting of one selected from the group consisting of a silicon oxide, an insulator, a silicon nitride, a metal oxide, and combinations thereof, and
         a handle substrate;
   implementing a lateral carrier transport and collection detector structure within the active semiconductor layer of the silicon-on-insulator structure; and
   implementing a neutron to high energy particle converter layer to generate energetic particles above the active semiconductor layer;
      wherein the lateral carrier transport and collection detector structure within the active semiconductor layer of the silicon-on-insulator structure has a high immunity to gamma ray generated carriers,
      wherein the lateral carrier transport and collection detector structure within the active semiconductor layer of the silicon-on-insulator structure has a fast rise time neutron detector response,
      wherein the lateral carrier transport and collection detector structure within the active semiconductor layer of the silicon-on-insulator structure can detect either a thermal neutron or a fast neutron.

* * * * *